Jan. 16, 1923.

W. C. MELVIN.
OIL GAUGE.
FILED JULY 14, 1919.

1,442,780.

INVENTOR
W. C. MELVIN

BY Strong & Townsend
ATTORNEYS

Patented Jan. 16, 1923.

1,442,780

UNITED STATES PATENT OFFICE.

WILLIAM C. MELVIN, OF COARSEGOLD, CALIFORNIA.

OIL GAUGE.

Application filed July 14, 1919. Serial No. 310,773.

*To all whom it may concern:*

Be it known that I, WILLIAM C. MELVIN, a citizen of the United States, residing at Coarsegold, in the county of Madera and State of California, have invented new and useful Improvements in Oil Gauges, of which the following is a specification.

This invention relates to an oil-gauge and particularly pertains to a device of that character, applicable for use with the crank cases of automobiles.

In the use and operation of automobiles of common construction, it has been the usual practice to provide the crank case with a petcock which may be opened to drain the oil from the crank case or to ascertain what the level of the oil was within the case. Most of these valves have been so disposed as to require that the owner of the car crawl beneath the frame and manipulate the valve with pliers. This has been a very objectionable task and due to the inconvenience, has often resulted in the valve being left open after testing so that the oil leaked out when the crank case was filled. It is the principal object of the present invention to provide a valve and gauge which is adapted to be mounted upon the crank case at a point below the normal safety level of the oil within the case and which gauge may be operated from above the floor of the automobile and in a manner to insure that the valve will be automatically closed when not in manual operation.

The present invention contemplates the use of a valve member adapted to be secured into the crank case of an automobile engine and which member is fitted with a valve plunger normally held in a seated position by a spring and adapted to be relieved therefrom by an operating cable or draw rod supplied with a handle or button which is disposed above the floor of the automobile.

The invention is illustrated by way of example in the accompanying drawings, in which:—

Referring more particularly to the drawings, 10 indicates an internal combustion engine which is fitted with the usual crank case, the case portion 11 being here shown as disposed beneath the center line of the automobile and intended normally to hold lubricating oil for the splash lubrication system of the engine. This portion of the crank case is beneath the floor 12 of the car and is inacessible except when reached from beneath the running boards or the frame. Under normal conditions a petcock 13 is fitted to the crank case portion 11 and when opened will of course, advise the operator whether the level of the oil within the crank case has fallen below the point of entry of the valve 13 or is yet standing above this point. If it has fallen below it will be proper warning that oil should be supplied, if above, the oil may be drained out and the approximate level easily determined.

Figure 1:
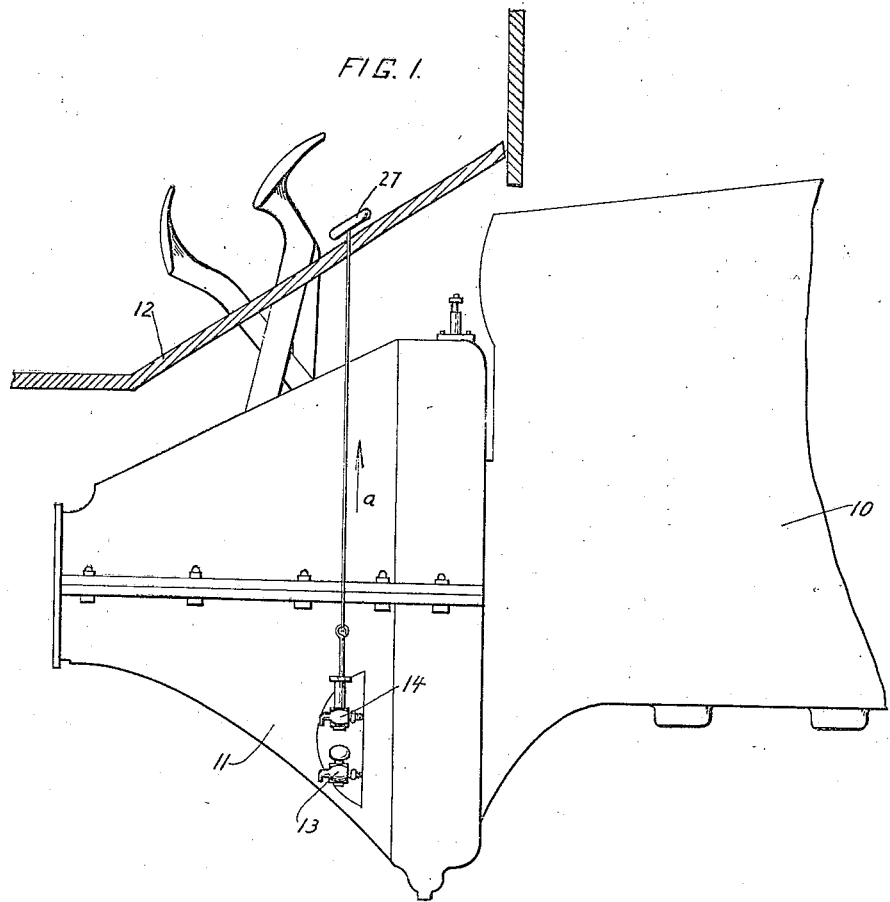
Fig. 1 is a fragmentary view in side elevation, illustrating the crank case of an automobile of common construction and further disclosing the application and arrangement of the combined valve and gauge.
Figure 2:
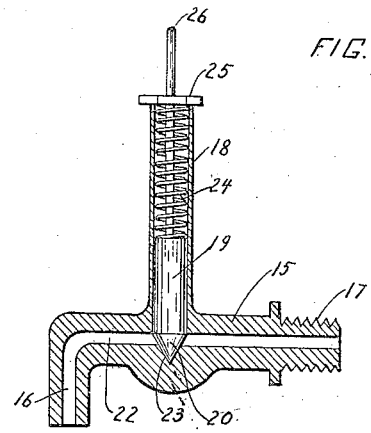
Fig. 2 is an enlarged view in vertical section, disclosing the valve used as a part of my invention.

The present invention contemplates the use of a valve member 14 which may be interchanged for the valve 13 or may be mounted upon the crank case and through an extra tapped hole. This valve member is more clearly shown in Fig. 2 where it will be seen to have a casing 15 formed with a horizontal body portion and a down-turned spout 16. The body portion is exteriorly threaded at the rear end to form a portion 17 adapted to pass through the wall of the crank case. The case is also formed with a vertical extending portion 18 which is designed to accommodate a valve plunger 19. The valve plunger is slidably disposed within the portion 18 and is fitted with a conical point 20, adapted to extend across a duct 22 in the valve casing and to normally seat within a conical seat 23. The valve is held in this position by means of an expansion helical spring 24 which is forced down by a nut 25, secured to the upper end of the member 18. Extending downwardly through the tubular portion 18 of the casing and fastened to the valve plunger 19 is an operating rod 26. This rod may be led to any convenient place and is here shown as extending directly through the floor board 12 of the automobile. Above this floor board a button 27 is provided to permit convenient grasp of the rod.

In operation of the present invention the crank case of the engine is filled with oil and in the event that a test is to be made to ascertain the possible quantity of oil remaining in the case, the member 27 is drawn upwardly and will thus pull the rod 26 in the direction of the arrow —a—. This action will lift the valve plunger 19 from its seat and permit the oil to flow outwardly through the nozzle 16, where it can be observed without the necessity of crawling beneath the car and manipulating the valve with pliers or other appliances. When the test has been made the member 27 is released and a spring 24 will force the plunger 19 onto its seat. This will insure that at no time will there be possibility of the valve remaining open and the oil leaking out when the crank case is being filled.

It will thus be seen that while the present invention is quite simple in its construction and may be very easily applied to automobiles of the present design, that at the same time a very desirable action will be obtained and that a combined valve and gauge will be produced which may be easily manipulated without the many conveniences now apparent.

While I have shown the preferred form of my invention, as now known to me, it will be understood that various changes in the combination, construction and arrangement of parts may be made by those skilled in the art, without departing from the spirit of the invention, as claimed.

Having thus described my invention, what I claim and desire to secure by Letters Patent is:—

1. In combination with the crank case of an automobile engine, a valve casing having an inlet and also an outlet arranged at right angles to the inlet and also having a relatively long internal passage connecting the inlet and outlet, said casing being also provided intermediate its ends with a relatively long tubular extension arranged at right angles to said passage and parallel with said outlet and whose interior is uniform in diameter throughout the length of the extension and of greater cross sectional diameter than the cross sectional diameter of said passage and having communication with said passage through an opening of a diameter the same as the diameter of the extension, the casing having an interior tapering valve seat formed in one wall of said passage directly opposite the opening through which said extension communicates with said passage, the inlet end of the valve casing being exteriorly screw threaded for connection with the crank case and having a laterally directed flange at the base of the screw threaded portion for engagement with the side of the crank case, a valve mounted to slide in said tubular extension, the greater portion of which is always confined within the extension, the outer end of the valve being tapered to fit in the aforesaid tapered seat, a stem projecting from the inner end of said valve through the outer end of said tubular extension and at its outer extremity provided with an eye, the valve having free sliding contact with the interior walls of the extension and being guided thereby, a spring encircling the stem and located between the inner end of the valve and the outer end of the tubular extension, and an operating rod connected to the eye of the stem and extending upwardly through the floor boards of the automobile to be grasped by the driver of the automobile to draw the valve from its seat, against the action of said spring, and thereby permit the flow of oil from the crank case through the passage and out of the outlet of the casing.

2. A valve casing having an inlet and also provided with an outlet which is arranged at right angles to the inlet, and also having an internal passage connecting the inlet and outlet, said casing being also provided intermediate its ends with a relatively long tubular extension arranged at right angles to said passage and parallel with said outlet and whose interior is uniform in diameter throughout the length of the extension, and having communication with said passage, the casing having an interior tapering valve seat formed in one wall of said passage directly opposite the communication of said extension with the passage, a valve mounted to slide in said tubular extension and having free sliding contact with the interior walls of the extension and guided thereby, the greater portion of the valve being always confined within the extension, the outer end of the valve being tapered to fit in the aforesaid tapered seat, a stem projecting from the inner end of said valve through the outer end of said tubular extension, a spring encircling the stem and located between the inner end of the valve and the outer end of the tubular extension, and an operating rod connected to the stem whereby upon a pull upon the operating rod the valve may be lifted from said seat against the action of said spring and thereby open the connecting passage between the inlet end and the outlet end of the casing.

In testimony whereof I have hereunto set my hand in the presence of two subscribing witnesses.

WILLIAM C. MELVIN.

Witnesses:
FLOYD W. JONES.
THOMAS BEASORE.